Patented Nov. 20, 1923.

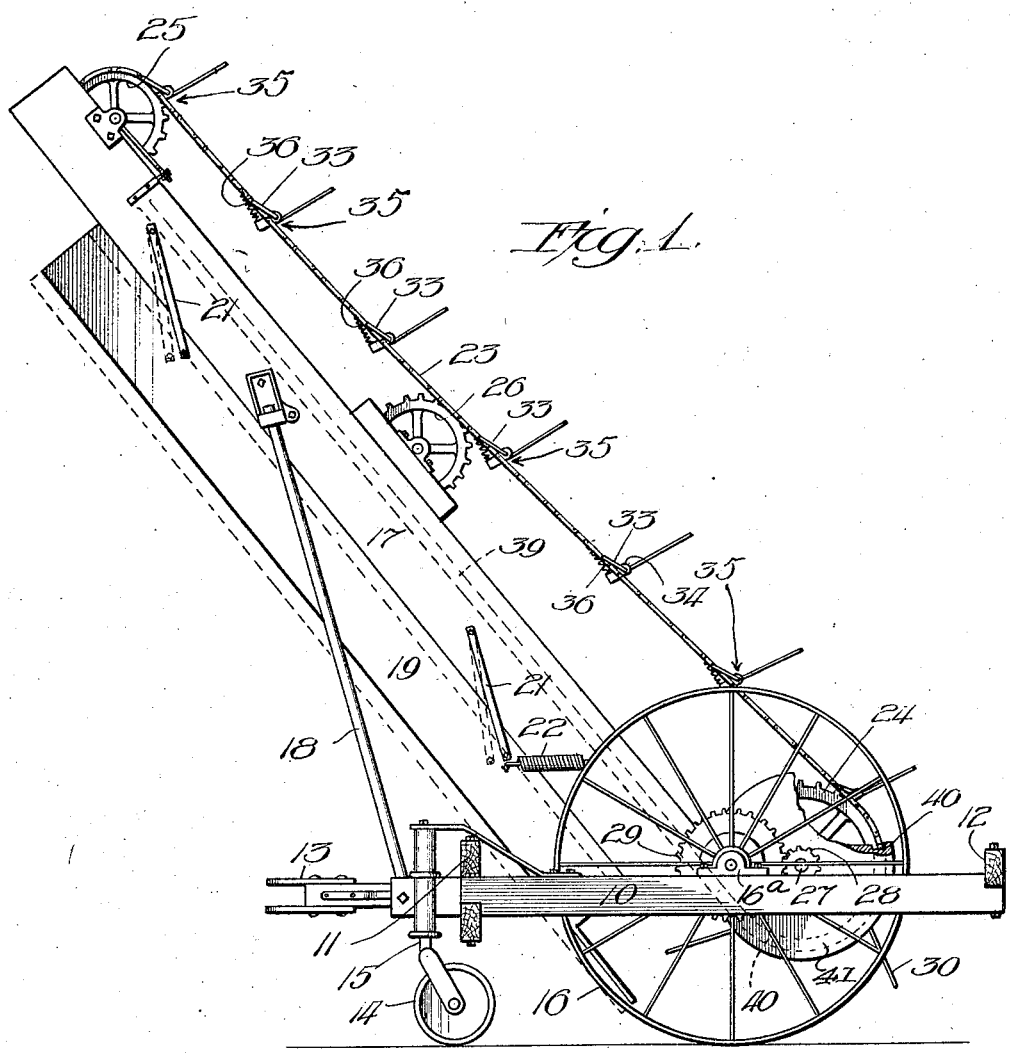

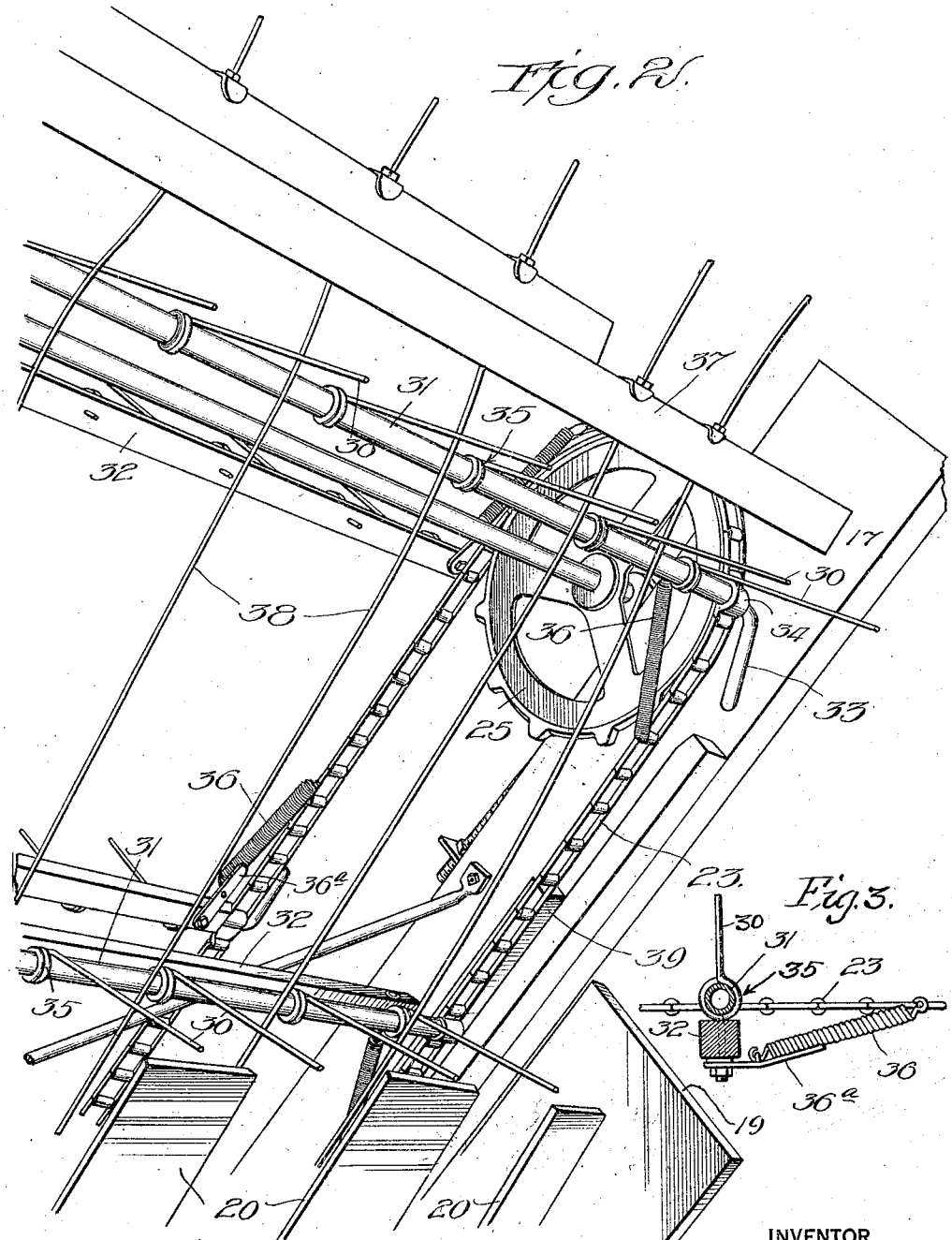

1,474,492

UNITED STATES PATENT OFFICE.

HARRY WILLIAM PIERSON, OF PRINCETON, ILLINOIS; SELMA W. PIERSON ADMINISTRATRIX OF SAID HARRY W. PIERSON, DECEASED.

HAY LOADER.

Application filed January 3, 1920. Serial No. 349,155.

*To all whom it may concern:*

Be it known that I, HARRY W. PIERSON, a citizen of the United States, residing at Princeton, in the county of Bureau and State of Illinois, have invented certain new and useful Improvements in Hay Loaders, of which the following is a specification.

This invention relates to hay loaders of the so-called cylinder type which employ a continuously moving carrier provided with teeth or prongs which dip down into hay and act to elevate the same along an inclined deck to the point of discharge.

The object of the present invention is to provide means for positively holding the rake teeth in their projected position during the elevation of the hay to the point of discharge, so that the pressure of the hay will not tend to bend back or displace the teeth while the pressure of the load is being carried thereby.

The invention further relates to the means provided for stripping the hay from the teeth and for permitting the teeth to turn back as they pass under the stripper bar, and thereafter resume their projected position, so that they will always approach the point of contact with the hay on the ground in projected or operative position.

In the drawings:

Figure 1 is a side elevation of the loader;

Fig. 2 is a perspective view looking upwardly from beneath toward the discharge end of the loader; and Fig. 3 is a detail of the spring connection between one of the rake heads and the carrier chain.

The loader is built upon a rectangular frame comprising side rails 10, front cross sills 11, and a rear cross sill 12. A suitable bracket 13 is provided for the attachment of the draw-bar of a tractor, and castor wheels 14 carried by spindles 15 at the front outer corners of the framework, in combination with large ground wheels 16 journaled in bearings 16ª on the side rails, serve to support the frame at a proper elevation above the ground.

The main frame carries an inclined supporting frame comprising side rails 17 which are braced and supported by brace bars 18, and the side rails of the supporting frame serve to carry a deck, comprising sides 19 and a slatted bottom 20 upon which the hay travels from the ground to the point of discharge to the hay wagon. The deck is adjustably mounted with respect to the supporting frame by means of a pair of links 21—21 set in oblique relation with respect to the rails 17 and the sides 19, and a spring 22 connected respectively to the side rail 17 and the deck side 19, serves to hold the parts in abutting relationship, as shown in full lines in Fig. 1, the spring being provided so that the deck may on occasion be forced down by the pressure of the hay into the position indicated by dotted lines, which adjustment is desirable in the raking of heavy hay in order to afford a larger measure of clearance between the slatted bottom of the deck and the raking teeth.

The raking mechanism comprises endless chains 23 which are carried upon a lower driving sprocket 24 and upper and intermediate idle sprockets 25 and 26 respectively. The lower driving sprockets are carried upon a sprocket shaft 27 having mounted thereon a pinion 28 which meshes with a pinion 29 on the ground wheel axle, so that as the hay loader advances the power derived from the ground wheels will rotate the driving sprocket and impart a continuous travel to the sprocket chains.

The sprocket chains have mounted thereon a plurality of transversely mounted rake heads 35, each of which comprises a tubular portion 31 and a backing bar 32, best shown in Fig. 3. Each of the tubular members terminates at each end in an angularly disposed finger 33 which lies outside of the plane of the carrier chains, and is adapted to ride in an adjacent guideway presently to be described. The tubular portions of the rake heads are journaled within mountings 34 formed on the adjacent link sections of the chain, so that the rake heads as a whole, together with the raking teeth 35 carried thereby, can be rocked or laid back from the outstanding position required for raking purposes into a position in substantial parallelism with the chains, as occasion may require. The rake teeth 30 are connected to the tubular portions of the rake head by coiling their inner ends around the tubular portions and securing them in any suitable manner against rotative movement thereon.

In order to normally return the rake teeth to outstanding position after they have been laid back for stripping purposes, each of the rake heads is provided at each end with a spring 36 which is connected at one end to the intermediate portion of an arm 36ª which projects from the rake head backing bar 32, and at its other end to one of the links of the chain, so that as the rake teeth are laid back a tension will be exerted on the spring, which will act to restore the parts to normal outstanding position as soon as the rake teeth are free to return, the contact of the arm 36ª with the spring serving to limit the return movement, as indicated in Fig. 3.

At the upper end of the loader and between the side rails 17 is a stripper bar 37 which also serves as a connection for the side rails. This stripper bar lies closely adjacent to the peripheries of the upper sprocket wheels so that as the projecting rake teeth pass under the stripper bar they will be laid back and the hay will be stripped therefrom as the teeth pass under the bar, this stripping action taking place under spring tension, with the result that as soon as the rake teeth have cleared the stripper bar they will return under spring tension to their outstanding position. The stripper bar coacts with a plurality of longitudinally arranged stripper rods 38 which are connected at their upper ends to the stripper bar, which rods are in spaced relation and extend between the rake teeth and serve the double function of preventing the hay from forcing itself up into the operative portions of the loader during its advance up the incline, and also assisting in the stripping operation at the point of discharge. The hay is thus maintained between the slats of the deck and the stripping rods, the slats preferably terminating at a point somewhat below the upper sprocket to afford an enlarged throat for the easy discharge of the hay. Most of the hay will be thus discharged before the stripping point is reached, but if any hay remains on the rake teeth the same will be stripped off before the teeth begin their return movement, so that the operating parts will be thoroughly cleaned and any clogging of hay prevented.

In order to positively hold the teeth in their projected position during the gathering and elevating movements of the rake teeth, and while the latter are subjected to the pressure of the hay, the fingers 33 are provided, which travel within guideways 39 formed on the inner faces of the side rails 17, which guideways lie immediately outside of and in parallel relation with the adjacent sprocket chains. Within said guideways the fingers 33 on each end of each of the rake heads travel until the discharge point is reached. The guideways terminate at some distance below the stripper bar 37, so that at the discharge point the rake teeth are free to turn back to permit the hay to discharge and to pass under the stripper bar. At this point in the travel of the rake teeth they will be held in projected position only by the tension of the springs 36, and not positively as heretofore.

Each of the side guideways 39 co-operates with a curved guideway 40 formed on the inner face of a disk or plate 41, which lies adjacent to the driving sprocket on the same side of the machine, so that as the rake teeth approach the hay gathering point the fingers 33 will, as the chain passes around the driving sprocket, enter the curved guideways 40 which merge into the side guideways 39, so that the rake teeth will be positively held in their projected position as they pass around the driving sprockets and begin their gathering operation.

The operation of the device may be briefly summarized as follows: As the machine advances, the ground wheels will be rotated, and power derived therefrom will be utilized to drive the lower sprocket wheels, so that the endless chains will be operated and the rake heads and rake teeth moved to gather and elevate the hay. The rake teeth, during the gathering and elevating operations, will be held against retraction both by the positive action of the guideways and by the action of the springs. This condition will continue until the discharge point is reached, at which time the rake heads and rake teeth will be released from positive support and allowed to rotate under spring tension for the purpose of discharging the hay and for permitting the rake teeth to pass under the stripping bar. Thereafter, the teeth being relieved from the pressure of the hay, will be returned to outstanding position by the action of the springs, so that the supporting fingers will be in position to enter the curving guideways as the rake heads approach the gathering point.

The arrangement is one which insures a positive cleaning of the rake teeth after each discharge, and which affords adequate means for preventing accidental recession of the teeth when serving the function of elevating a heavy cut of hay, and the provision of the stripping rods serves to insure against accidental lifting of the hay to a point where it might interfere with the action of the moving portions of the mechanism.

I claim:

1. In a hay loader, the combination of a supporting frame, ground wheels, endless chains driven by the ground wheels, rake heads rotatably mounted upon the endless chains, rake teeth carried by the rake heads, fingers connected with the rake heads, guides for engaging the fingers to positively hold the rake teeth in projected position during the gathering and elevating operations, said guides terminating at the discharging point to permit a recession of the rake teeth, and a spring for each rake head for permitting the teeth when released to return under spring tension, substantially as described.

2. In a hay loader, the combination of a supporting frame, ground wheels, endless chains driven by the ground wheels, rake heads rotatably mounted upon the endless chains, rake teeth carried by the rake heads, fingers connected with the rake heads, guides for engaging the fingers to positively hold the rake teeth in projected position during the gathering and elevating operations, said guides terminating at the discharging point to permit a recession of the rake teeth, a spring for each rake head for permitting the teeth when released to recede under spring tension, and a transversely extending stripper bar positioned to be engaged by the teeth when the fingers are released from the guideways, substantially as described.

3. In a hay loader, the combination of a supporting frame, ground wheels, endless chains driven by the ground wheels, rake heads rotatably mounted upon the endless chains, rake teeth carried by the rake heads, fingers connected with the rake heads, guides for engaging the fingers to positively hold the rake teeth in projected position during the gathering and elevating operations, said guides terminating at the discharge point to permit a recession of the rake teeth, a spring for each rake head for permitting the teeth when released to recede under spring tension, a transversely extending stripper bar positioned to be engaged by the teeth when the fingers are released from the guideways, and longitudinally extending stripper rods through which the teeth project, substantially as described.

4. In a hay loader, the combination of a main frame, ground wheels supporting the main frame, an inclined elevator frame, a deck below the elevator frame along which the hay is conveyed, endless chains carried by the elevator frame, driving sprockets driven by the ground wheels for operating the endless chains, rake heads rotatably mounted upon the endless chains and provided with guide fingers, rake teeth carried by the rake heads, guides adapted to be engaged by the guide fingers for holding the rake teeth in projected position, the chain being operated to elevate the hay beneath the chains and along the underlying deck, the guides terminating at the discharging point to permit a recession of the teeth for discharging the hay, and springs for restoring the teeth to projected position after the discharging operation, substantially as described.

5. In a hay loader, the combination of a main frame, ground wheels supporting the main frame, an inclined elevator frame, a deck below the elevator frame along which the hay is conveyed, endless chains carried by the elevator frame, driving sprockets driven by the ground wheels for operating the endless chains, rake heads rotatably mounted upon the endless chains and provided with guide fingers, rake teeth carried by the rake heads, guides adapted to be engaged by the guide fingers for holding the rake teeth in projected position, the chain being operated to elevate the hay beneath the chains and along the underlying deck, the guides terminating at the discharging point to permit a recession of the teeth for discharging the hay, springs for restoring the teeth to projected position after the discharging operation, and a transversely arranged stripper bar adapted to be engaged by the rake teeth after the release of the fingers from the guideways for laying back the teeth under spring tension and stripping the hay therefrom, substantially as described.

6. In a hay loader, the combination of a supporting frame, an elevating frame, ground wheels, endless chains driven by the ground wheels, rake heads mounted upon the endless chains, rake teeth carried by the rake heads, a deck carried by the elevating frame below the endless chains, and link and spring connections between the deck and the elevating frame for allowing the deck to accommodate itself to excess pressure of hay, substantially as described.

7. In a hay loader, the combination of a supporting frame, an elevating frame, ground wheels, endless chains driven by the ground wheels, rake heads mounted upon the endless chains, rake teeth carried by the rake heads, a deck carried by the elevating frame below the endless chains, link and spring connections between the deck and the elevating frame for allowing the deck to accommodate itself to the excess pressure of hay, and stripper rods extending longitudinally of the elevating frame through which the rake teeth project when in contiguous relation to the deck, substantially as described.

8. In a hay loader, the combination of a supporting frame, an elevating frame, ground wheels, endless chains driven by the ground wheels, rake heads mounted upon the endless chains, rake teeth carried by the rake heads, a deck, obliquely arranged links connecting the deck to the elevating frame, and a spring for holding the deck in abutting relation with respect to the elevating frame and adapted to permit the deck to swing back from the frame under the excess pressure of the hay, substantially as described.

9. In a hay loader, the combination of a supporting frame, an elevating frame, ground wheels, elevating means, a deck carried by the elevating frame below the elevating means, and link and spring connections between the deck and the elevating frame for allowing the deck to accommodate itself to excess pressure of hay, substantially as described.

HARRY WILLIAM PIERSON.